(12) United States Patent
Elliott

(10) Patent No.: US 6,883,943 B2
(45) Date of Patent: Apr. 26, 2005

(54) MOTORCYCLE FRAME SLIDER HAVING ELEMENTS OF INTERNAL REFRACTION AND REFLECTION

(76) Inventor: Pierre Elliott, 10145 NW. 46 St., Sunrise, FL (US) 33351

( * ) Notice: Subject to any disclaimer, the term of this patent is extended or adjusted under 35 U.S.C. 154(b) by 60 days.

(21) Appl. No.: 10/456,414

(22) Filed: Jun. 6, 2003

(65) Prior Publication Data

US 2004/0213006 A1 Oct. 28, 2004

Related U.S. Application Data

(60) Provisional application No. 60/448,171, filed on Feb. 14, 2003.

(51) Int. Cl.[7] .................................................. B62J 6/00
(52) U.S. Cl. ........................ 362/473; 362/545; 362/800
(58) Field of Search ............................... 362/473, 474, 362/475, 476, 800, 545

(56) References Cited

U.S. PATENT DOCUMENTS 6,398,393 B1 * 6/2002 Perse ......................... 362/473
D466,840 S     12/2002 Ortner
6,789,927 B2 *  9/2004 Tracey ....................... 362/473

* cited by examiner

Primary Examiner—Sandra O'Shea
Assistant Examiner—Hargobind S. Sawhney
(74) Attorney, Agent, or Firm—Melvin K. Silverman

(57) ABSTRACT

In a cycle having a bolt integrally secured to a cycle main frame or an engine block of the cycle, the bolt projecting transversely from the cycle relative to a vertical plane of symmetry, a novel cycle frame slider includes an elongate hollow cylinder having an internal diameter, an outside diameter and an annular region, the cylinder formed of a durable optically transmissible polymer, the cylinder having a proximal end and a distal end, the proximal end of the cylinder proportioned for securable engagement with the bolt, the cylinder having an axial length in a range of about 10 to about 15 centimeters. The slider also includes a plurality of light-emitting elements circumferentially secured within and about the proximal end of the hollow cylinder, the light-emitting elements providing for control of on-off cycling and blinking, the light-emitting elements in optical communicating with the annular region of the cylinder. Electrical communication is effected between the light-emitting elements and a directional signal circuit of the cycle.

12 Claims, 3 Drawing Sheets

MOTORCYCLE FRAME SLIDER HAVING ELEMENTS OF INTERNAL REFRACTION AND REFLECTION

REFERENCE TO RELATED APPLICATION

This application is a non-provisional utility conversion of Application Ser. No. 60/448,171, filed Feb. 14, 2003. The benefit thereof under 35 U.S.C. 119(e) is claimed.

BACKGROUND OF THE INVENTION

A. Area of Invention

The present invention relates to motorcycles.

B. Prior Art

In the art of motorcycles, motorbikes and the like, users and riders thereof often prefer to employ a device known as a frame slider in lieu of a directional signal.

A typical location of a frame slider 10 upon a motorcycle 12 is shown in FIG. 1. Frame sliders which function in essentially the fashion of a directional signal have been known in the art as a turn or directional signal substitute. However, the instant invention is directed to an improvement of the conventional motorcycle frame slider to provide improved safety to the frame and faring (the decorative plastic housing of the cycle), as well as to provide a turn signal of enhanced visibility and aesthetics. Further, the present invention relates to a frame slider kit to facilitate attachment of the frame slider to the engine 14 of the cycle 12, this as is more fully set forth below.

Motorcycle frame sliders have been addressed in the prior art solely in terms of aesthetics, as may be noted in U.S. Des. Pat. No. 466,840 to Ortner. The instant invention, while providing a novel aesthetic, also furnishes important and inventive functions and structure.

SUMMARY OF THE INVENTION

In a cycle having a bolt integrally secured to a cycle main frame or an engine block of the cycle, said bolt projecting transversely from said cycle relative to a vertical plane of symmetry thereof, a novel cycle frame slider comprises an elongate hollow cylinder having an internal diameter, an outside diameter and an annular region therebetween, said cylinder formed of a durable optically transmissible polymer, said cylinder having a proximal end and a distal end, said proximal end of said cylinder proportioned for securable engagement with said bolt, said cylinder having an axial length in a range of about 10 to about 15 centimeters. The slider also includes a plurality of light-emitting means circumferentially secured within and about said proximal end of said hollow cylinder, said light-emitting means including means for control of on-off cycling and blinking thereof, said light-emitting means in optical communicating with said annular region of said cylinder; and means for effecting electrical communication between said light-emitting means and a directional signal circuit of said cycle. Thereby, said axial length of said frame slider, in combination with said durable polymer, provides protection to the cycle in the event that it tips or falls over from a stationary position and, further whereby, superior cycle visibility and particular aesthetic effects are obtained by properties of internal reflection and refraction within said hollow cylinder by the operation of said light-emitting means in optical communication with said cylinder.

It is accordingly an object of the invention to provide a motorcycle frame slider having improved functions of safety, visibility and aesthetics to an external observer thereof.

The above and yet other objects and advantages of the present invention will become apparent form the hereinafter set forth Brief Description of the Drawings and Detailed description of the Invention.

DETAILED DESCRIPTION OF THE INVENTION

Figure 1:
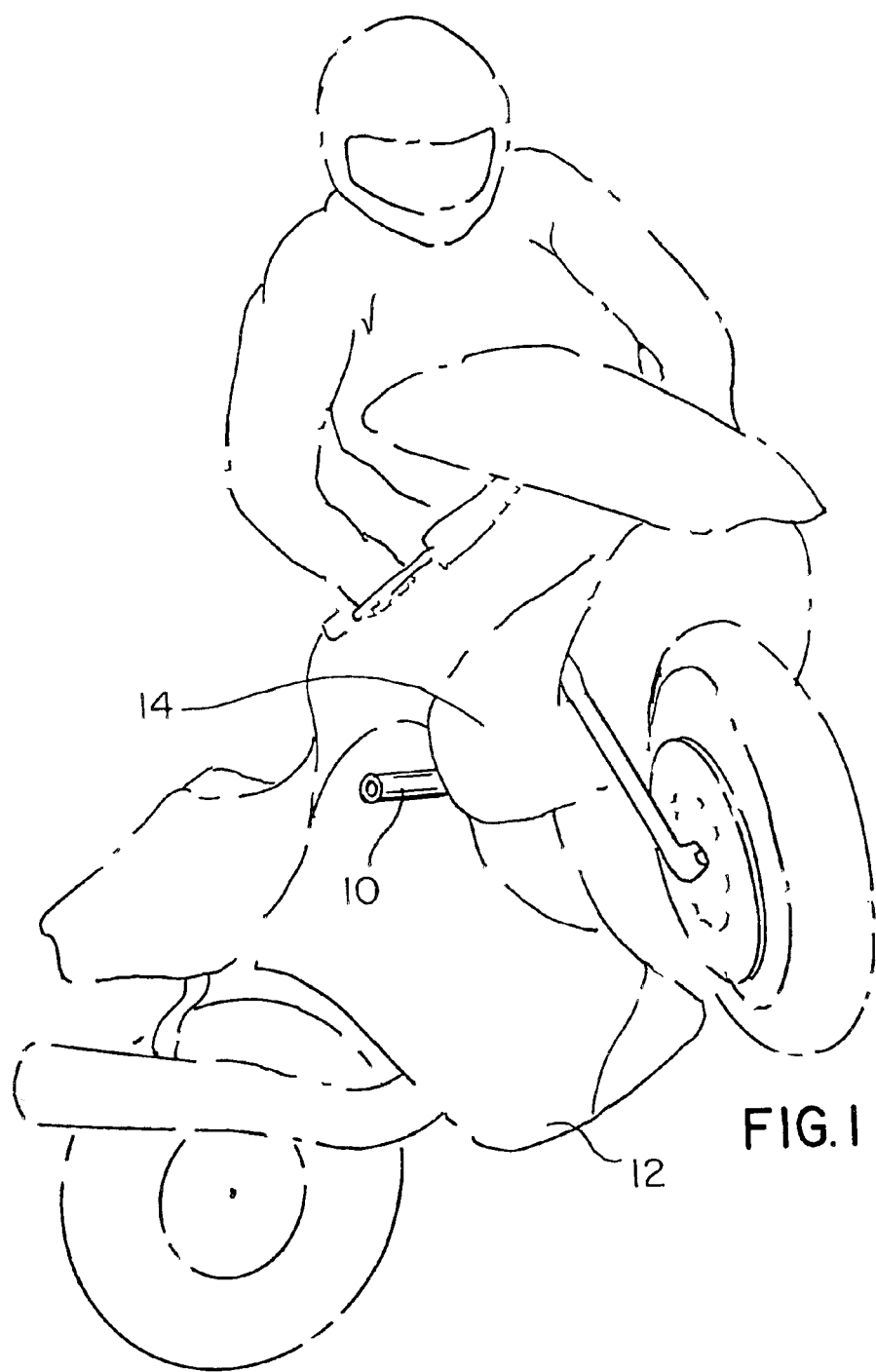
FIG. 1 is a perspective view of a motorcycle showing the general geometry and position of the inventive frame slider.

With reference to FIG. 1 there is shown, in perspective view, a frame slider 10, the position of which relative to a cycle 12 is also shown in FIG. 1.

Figure 2:
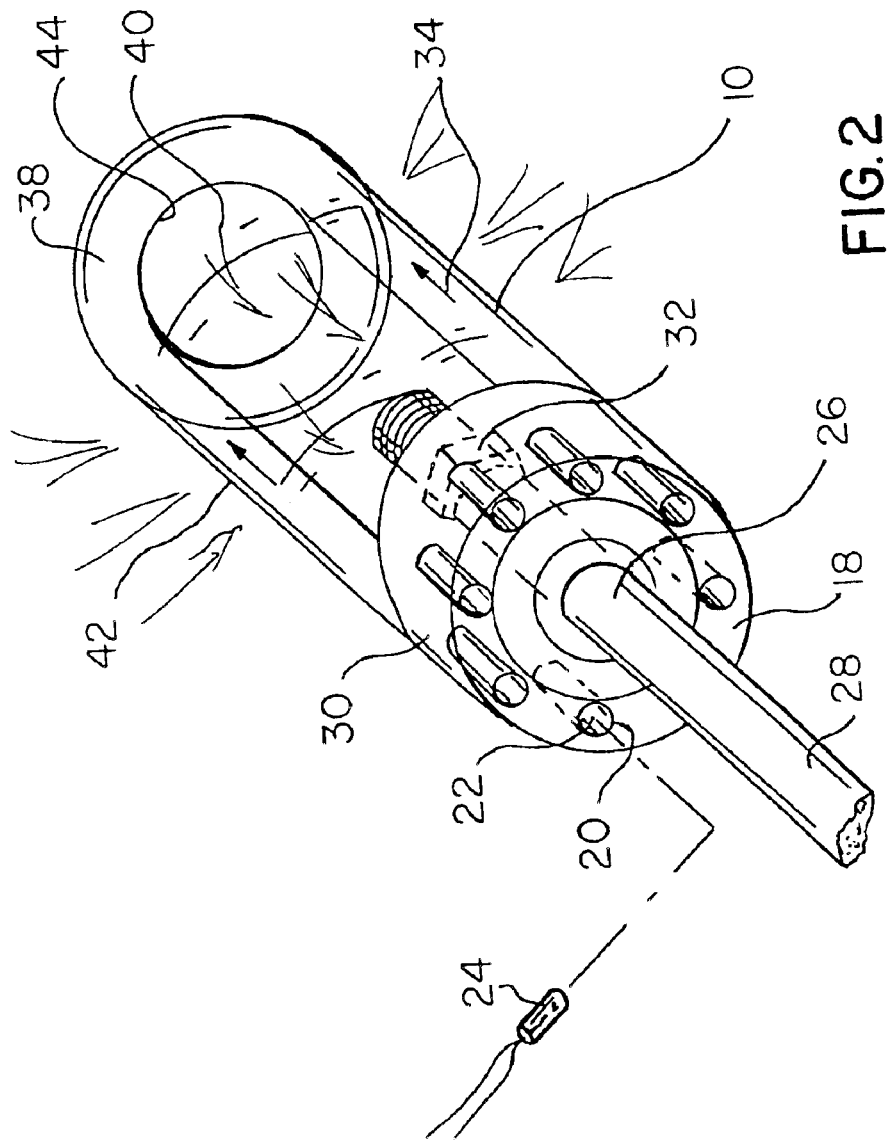
FIG. 2 is a perspective, exploded, view of the frame slider and the bolt which facilitates attachment thereof to the engine of the cycle.

In FIG. 2 may be seen the general hollow cylindrical geometry of the frame slider which, at a proximal or bike-side surface 18 thereof, includes a plurality (typically eight) of recesses 20 into which are positioned LEDs 22, each of which are in electrical communication with a directional signal control circuit 24 of the cycle 12. Therein, the on-off cycling and blink rate of LEDs 22 are controlled by the same control circuit that would control the directional signal of the motorcycle if the same were not replaced by the inventive frame slider 10.

Figure 3:
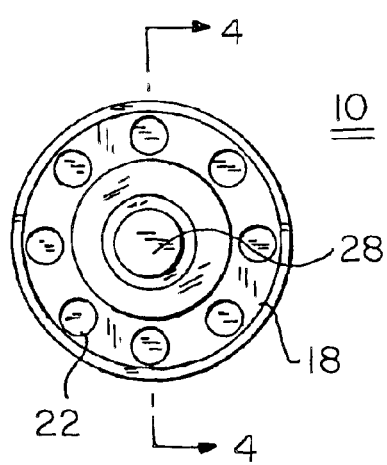
FIG. 3 is a proximal or cycle-side axial plan view of the inventive frame slider.
Figure 4:
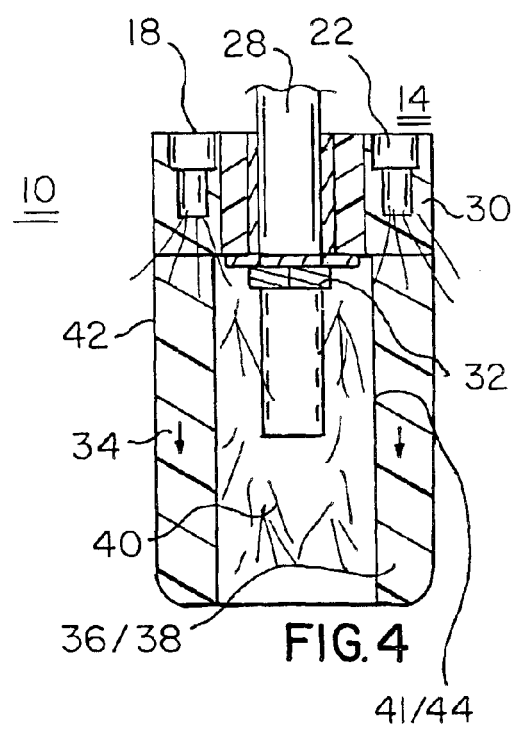
FIG. 4 is a diametric cross-sectional view taken along Line 4—4 of FIG. 3.

Said proximal surface 18 of the frame slider includes an opening 26 (see also FIG. 3) through which a bolt 28 attaches directly into a threaded bore hole (not shown) within cycle engine 14. Attachment to the engine is further facilitated by a collar or journal 30 (see FIGS. 2 and 4) at the proximal end of the slider 10 such that a nut 32 may be used to secure said bolt 28 within the frame slider.

Figure 5:
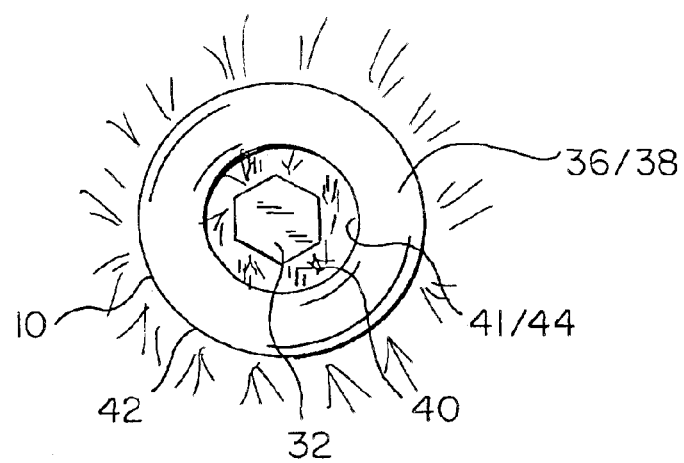
FIG. 5 is a distal or outer axial plan view of the inventive device.

The outer portion of the frame slider is formed of a high impact translucent polycarbonate which, it has been found, provides a number of beneficial properties to the inventive frame slider. More particularly, it has been found that different colored LEDs 20, e.g., a combination of colors, such as amber, blue, green, white, red, yellow and purple, will transmit distally in direction 34 through the polymeric medium of said polycarbonate. This will result in a pattern of internal reflection 36 within outer shell 38 of the translucent polycarbonate. See FIG. 5.

The aesthetics and the optics associated with the instant invention are also enhanced by axial cavity 40 within which substantial internal reflection will occur. Further, refraction will occur at the air-plastic interface 41 at the inner surface of cavity 10, thereby enhancing the overall and unique appearance of the slider when the directional signals and its LEDs 22 are activated.

It has also been discovered that the provision of a frosted surface 42 on the exterior of the slider and 44 upon the interior of axial cavity 40 (see FIGS. 4 and 5) will enhance the above-referenced properties of internal reflection within outer shell 38, internal reflection within said axial cavity 40 of the slider 10, (see FIGS. 4 and 5), and refraction at said interface 41.

Resultant of the above, there is achieved a motorcycle frame slider which will not only protect the cycle and faring thereof from damage in the event that the cycle accidentally tips over but, as well, serves as a turning or directional signal of greatly enhanced visibility and aesthetic appeal. For example, in a given selection of colors and timing of said LEDs 22, the frame slider 10 can exhibit the appearance of a frame projecting from the proximal to the distal end thereof.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention, what I claim and, accordingly secure by Letters Patent of the United States is:

1. In a cycle having a bolt integrally secured to a cycle main frame or an engine block of the cycle, said bolt projecting transversely from said cycle relative to a vertical plane of symmetry thereof, a cycle frame slider comprising:
   (a) an elongate hollow cylinder having an internal diameter, an outside diameter and an annular region therebetween, said cylinder formed of a durable optically transmissible polymer, said cylinder having a proximal end and a distal end, said proximal end of said cylinder proportioned for securable engagement with said bolt, said cylinder having an axial length in a range of about 10 to about 15 centimeters;
   (b) a plurality of light-emitting means circumferentially secured within and about said proximal end of said hollow cylinder, said light-emitting means including means for control of on-off cycling and blinking thereof, said light-emitting means in optical communicating with said annular region of said cylinder; and
   (c) means for effecting electrical communication between said light-emitting means and a directional signal circuit of said cycle,
   whereby said axial length of said frame slider, in combination with said durable polymer, provides protection to the cycle in the event that it tips or falls over from a stationary position and, further whereby, superior cycle visibility and particular aesthetic effects are obtained by properties of internal reflection and refraction within said hollow cylinder by the operation of said light-emitting means in optical communication with said cylinder.

2. The cycle frame slider as recited in claim 1, in which said plurality of light emitting means comprise respectively differently colored light-emitting diodes.

3. The cycle frame slider as recited in claim 1, in which said outside diameter of said cylinder includes a frosted or polished surface thereon,
   whereby reflection within said outside diameter is thereby enhanced.

4. The cycle frame slider as recited in claim 1, in which said internal diameter of said cylinder includes a frosted or polished surface thereon,
   whereby reflection within said internal diameter is thereby enhanced.

5. The cycle frame slider as recited in claim 3, in which said internal diameter of said cylinder includes a frosted or polished surface thereon,
   whereby reflection within said internal diameter and internal refraction within said annular region are thereby enhanced.

6. The cycle frame slider as recited in claim 1, in which said polymer of said cylinder comprises a polycarbonate.

7. The cycle frame slider as recited in claim 1, in which said polymer includes a pigment color-coordinated with the exterior of said cycle.

8. The cycle frame slider as recited in claim 1, in which said outside diameter comprises a range of between about 10 and about 12 centimeters.

9. The cycle frame slider as recited in claim 8, in which said inside diameter comprises a range of between about 6 and about 8 centimeters.

10. The cycle frame slider as recited in claim 9, in which said annular region of said cylinder comprises a radial dimension of between 1 and about 3 centimeters.

11. The cycle frame slider as recited in claim 1, in which a radial surface of said distal end of said cylinder comprises a beveled surface.

12. The cycle frame slider as recited in claim 1, further comprising:
   within said proximal end of said cylinder, a collar element within which said light emitting means are embedded and in which said collar is proportioned for seducement with said cycle bolt.

* * * * *